(12) United States Patent
Fukuura

(10) Patent No.: US 11,573,121 B2
(45) Date of Patent: Feb. 7, 2023

(54) SENSOR ELEMENT

(71) Applicant: KYOCERA Corporation, Kyoto (JP)

(72) Inventor: Atsuomi Fukuura, Kyoto (JP)

(73) Assignee: KYOCERA Corporation, Kyoto (JP)

(*) Notice: Subject to any disclaimer, the term of this patent is extended or adjusted under 35 U.S.C. 154(b) by 242 days.

(21) Appl. No.: 16/634,616

(22) PCT Filed: Jul. 19, 2018

(86) PCT No.: PCT/JP2018/027127
§ 371 (c)(1),
(2) Date: Jan. 28, 2020

(87) PCT Pub. No.: WO2019/021936
PCT Pub. Date: Jan. 31, 2019

(65) Prior Publication Data
US 2020/0232843 A1 Jul. 23, 2020

(30) Foreign Application Priority Data
Jul. 28, 2017 (JP) .............................. JP2017-147030

(51) Int. Cl.
G01H 11/08 (2006.01)
G01L 1/18 (2006.01)
G01N 5/02 (2006.01)
G01N 27/04 (2006.01)

(52) U.S. Cl.
CPC ................ *G01H 11/08* (2013.01); *G01L 1/18* (2013.01); *G01N 5/02* (2013.01); *G01N 27/04* (2013.01)

(58) Field of Classification Search
CPC .. G01H 11/08; G01K 7/18; G01J 1/44; G01N 5/02; G01N 27/04; G01T 1/00; G06F 3/0412; G01L 1/18
USPC ............................................................ 73/649
See application file for complete search history.

(56) References Cited

U.S. PATENT DOCUMENTS

| 8,159,059 | B2* | 4/2012 | Maeda | B81B 7/0048 |
| | | | | 257/686 |
| 9,212,959 | B2 | 12/2015 | Yoshikawa et al. | |
| 10,564,082 | B2 | 2/2020 | Shiba et al. | |
| 2013/0133433 | A1 | 5/2013 | Yoshikawa et al. | |
| 2014/0063753 | A1* | 3/2014 | Chino | H05K 9/002 |
| | | | | 361/729 |
| 2014/0224002 | A1* | 8/2014 | Fukuura | G01N 29/022 |
| | | | | 73/64.53 |
| 2014/0352447 | A1 | 12/2014 | Yoshikawa et al. | |

FOREIGN PATENT DOCUMENTS

| JP | 2006-003100 A | 1/2006 |
| JP | 2011-203008 A | 10/2011 |
| JP | 2013019727 * | 1/2013 |
| JP | 2014-153135 A | 8/2014 |

(Continued)

*Primary Examiner* — Octavia Davis Hollington
(74) *Attorney, Agent, or Firm* — Studebaker & Brackett PC

(57) ABSTRACT

A sensor element comprises: a first substrate; a detector disposed on the first substrate; and a second substrate surrounding the first substrate and supporting the first substrate. The second substrate is thicker than the first substrate. The second substrate has a connection part which is connected to the first substrate and a non-connection part which is not connected to the first substrate. The detector is located in the vicinity of the connection part.

11 Claims, 5 Drawing Sheets

(56) References Cited

FOREIGN PATENT DOCUMENTS

| | | |
|---|---|---|
| WO | 2011/148774 A1 | 12/2011 |
| WO | 2015/198185 A1 | 12/2015 |
| WO | 2016/121155 A1 | 8/2016 |

* cited by examiner

SENSOR ELEMENT

CROSS REFERENCE TO RELATED APPLICATION

This application claims priority to and the benefit of Japanese Patent Application No. 2017-147030 filed on Jul. 28, 2017, the entire disclosure of which is incorporated herein by reference.

TECHNICAL FIELD

The present disclosure relates to a sensor element.

BACKGROUND

Sensors for detecting specific substances in fluids are conventionally known. For example, PTL 1 discloses a gas sensor including a diaphragm portion and a plurality of sensitive membranes formed on a surface of the diaphragm portion.

CITATION LIST

Patent Literature

PTL 1: JP 2014-153135 A

SUMMARY

A sensor element according to an embodiment of the present disclosure comprises: a first substrate; a detector disposed on the first substrate; and a second substrate surrounding the first substrate and supporting the first substrate. The second substrate is thicker than the first substrate. The second substrate has a connection part which is connected to the first substrate and a non-connection part which is not connected to the first substrate. The detector is located in a vicinity of the connection part.

A sensor element according to an embodiment of the present disclosure comprises: a first substrate; a detector disposed on the first substrate; and a second substrate surrounding the first substrate and supporting the first substrate. The second substrate is thicker than the first substrate. The second substrate has a projection that projects toward the first substrate. The detector is located in a vicinity of the projection.

DETAILED DESCRIPTION

Conventionally, sensors for detecting specific substances in fluids are required to have improved detection accuracy. The present disclosure relates to provision of a sensor element having improved detection accuracy. Embodiments of the present disclosure will be described below, with reference to the drawings.

First Embodiment

Figure 1:
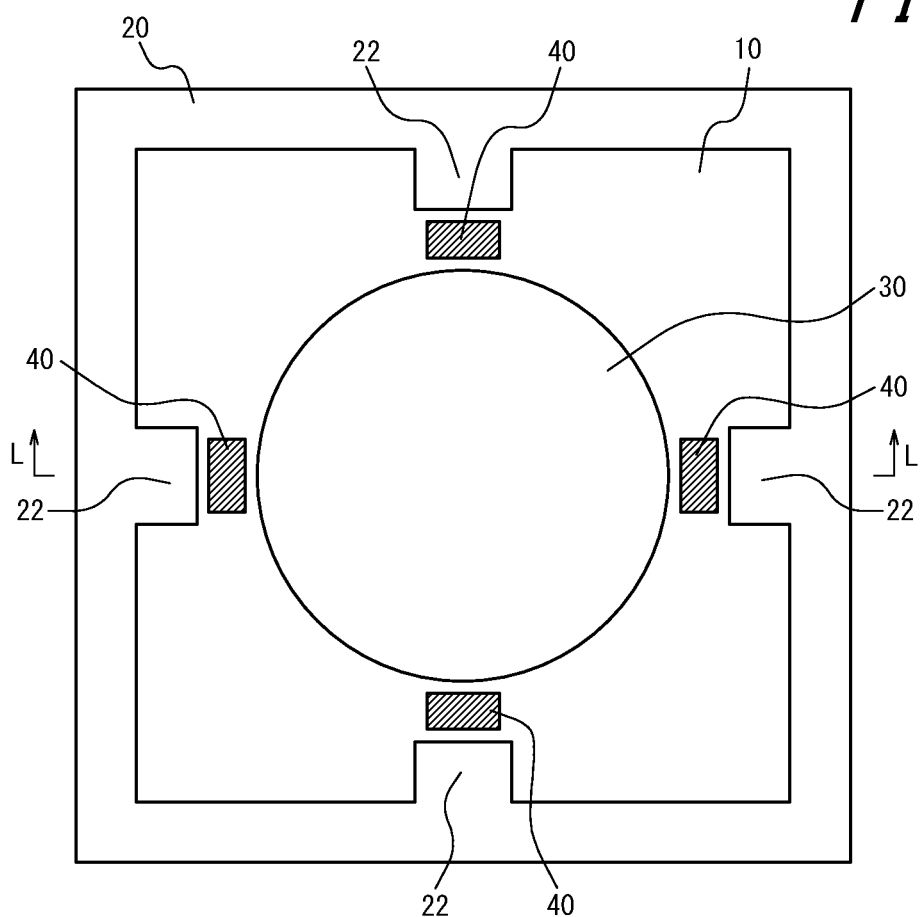
FIG. 1 is a top view illustrating a schematic structure of a sensor element according to a first embodiment of the present disclosure.
Figure 2:
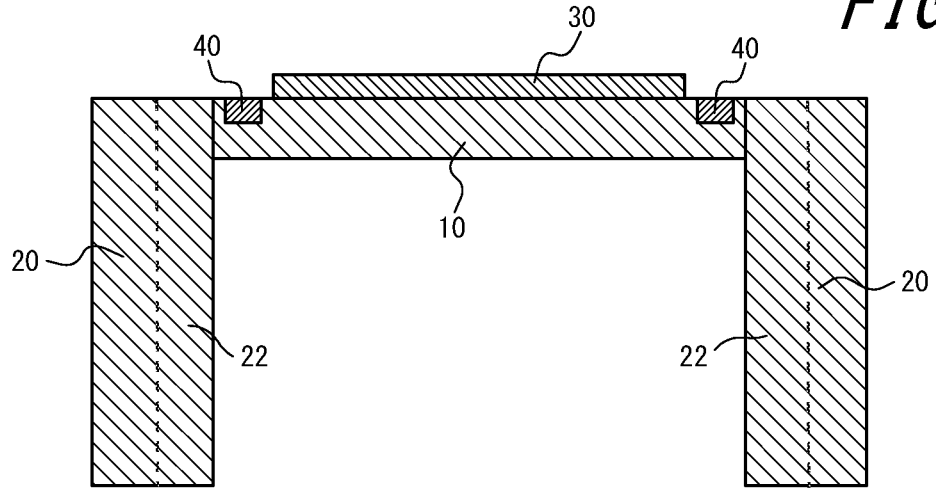
FIG. 2 is a sectional view along line L-L of the sensor element illustrated in FIG. 1.

FIG. 1 is a top view illustrating a schematic structure of a sensor element 1 according to a first embodiment of the present disclosure. FIG. 2 is a sectional view along line L-L of the sensor element 1 illustrated in FIG. 1. It is assumed herein that the front side of FIG. 1 is the upper side, and the side opposite to the front side is the lower side.

The sensor element 1 includes a first substrate 10, a second substrate 20, a sensitive membrane 30, and four piezoresistive elements (detectors) 40. The sensor element 1 detects the substance in a fluid by the sensitive membrane 30 adsorbing the substance in the fluid. For example, a gas is blown on the sensor element 1 from the upper surface side. The sensor element 1 is capable of detecting whether predetermined gas molecules to be detected are contained in the blown gas.

The first substrate 10 is a deformable thin substrate, and functions as a diaphragm. When the sensitive membrane 30 disposed on the upper surface of the first substrate 10 deforms, the first substrate 10 deforms depending on the degree of deformation of the sensitive membrane 30. The first substrate 10 connects to the second substrate 20 that is thicker than the first substrate 10, and is supported by the second substrate 20. The first substrate 10 may be, for example, an n-type Si substrate.

The second substrate 20 surrounds the first substrate 10, and connects to and supports the first substrate 10. The thickness of the second substrate 20 is greater than the thickness of first substrate 10. The second substrate 20 has projections 22 that project toward the first substrate 10 in a top view. The second substrate 20 may be, for example, an n-type Si substrate.

The sensitive membrane 30 is disposed on the upper surface of the first substrate 10. The sensitive membrane 30 is circular in the example in FIG. 1, but is not limited to such a shape. For example, the sensitive membrane 30 may be shaped like a polygon such as a tetragon. The sensitive membrane 30 may be located on the upper surface of the second substrate 20, and may cover at least part of the piezoresistive elements (detectors) 40.

The sensitive membrane 30, when a substance to be detected is adsorbed by its surface, deforms by expansion, contraction, or the like due to, for example, physical contact with the substance or a chemical reaction with the substance. The sensitive membrane 30 is made of a material in accordance with the substance to be detected. Examples of the material of the sensitive membrane 30 include polystyrene, chloroprene rubber, polymethylmethacrylate, and nitrocellulose.

The piezoresistive elements 40 are disposed on the first substrate 10. The expression "disposed on the first substrate 10" herein includes a state of being disposed on the upper surface of the first substrate 10 and a state of being embedded in the first substrate 10 on the upper surface side of the first substrate 10 as illustrated in FIG. 2. The piezoresistive elements 40 are located on the first substrate 10 in the vicinity of the projections 22 of the second substrate 20.

The piezoresistive elements 40 change in resistance in response to the stress applied thereto. When the substance to be detected is adsorbed by the sensitive membrane 30 and the first substrate 10 deforms, the stress applied to the piezoresistive elements 40 changes. Accordingly, when the substance to be detected is adsorbed by the sensitive membrane 30, the piezoresistive elements 40 change in resistance. The changes in resistance of the piezoresistive elements 40 are output to an external control device or the like through wires, as electrical signals.

For example, in the case where the first substrate 10 is an n-type Si substrate, the piezoresistive elements 40 can be formed by diffusing boron (B) into the first substrate 10.

The piezoresistive elements 40 are located on the first substrate 10 in the vicinity of the projections 22 of the second substrate 20, as illustrated in FIG. 1. The regions of the first substrate 10 in the vicinity of the projections 22 are regions in which stress concentrates. Therefore, in these regions, the stress changes greatly when the first substrate 10 deforms. Accordingly, when the first substrate 10 deforms, the piezoresistive elements 40 change greatly in resistance. The sensor element 1 according to this embodiment thus has improved detection accuracy for the substance to be detected.

Second Embodiment

Figure 3:
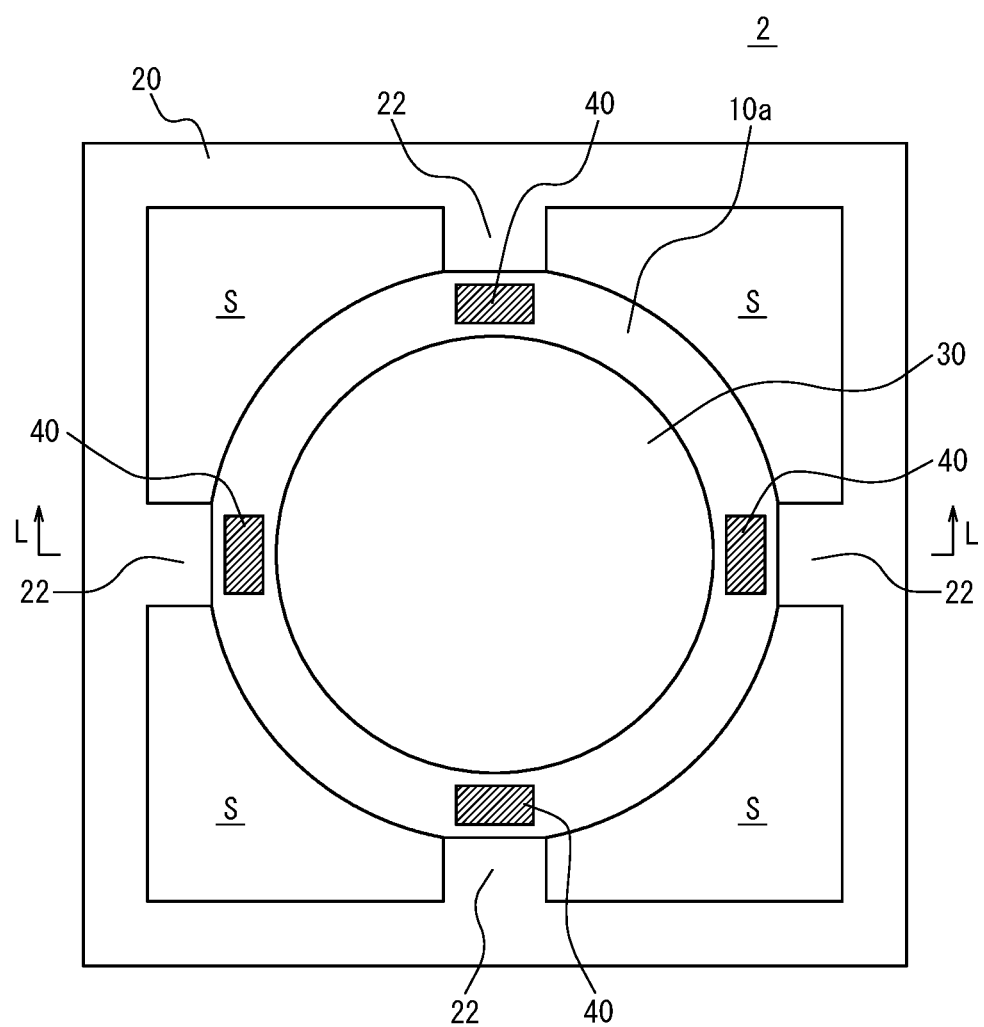
FIG. 3 is a top view illustrating a schematic structure of a sensor element according to a second embodiment of the present disclosure.

FIG. 3 is a top view illustrating a schematic structure of a sensor element 2 according to a second embodiment of the present disclosure. A sectional view along line L-L of the sensor element 2 illustrated in FIG. 3 is the same as the sectional view along line L-L of the sensor element 1 according to the first embodiment in FIG. 2, and therefore its illustration is omitted. Components in FIG. 3 that are the same as those in FIG. 1 are given the same reference signs, and their description is omitted.

The sensor element 2 includes a first substrate 10a, the second substrate 20, the sensitive membrane 30, and the four piezoresistive elements (detectors) 40.

The first substrate 10a differs from the first substrate 10 in the first embodiment in that it is perforated by notches S. Hence, the first substrate 10a connects to the second substrate 20 only at the projections 22. In other words, the second substrate 20 has connection parts which are connected to the first substrate 10a and non-connection parts which are not connected to the first substrate 10a. The connection parts herein are the tips of the projections 22 that project toward the first substrate 10a.

The first substrate 10a is approximately circular in the example in FIG. 3, but is not limited to such a shape. For example, the first substrate 10a may be shaped like a polygon such as a tetragon.

The second substrate 20 surrounds the first substrate 10a, and connects to the first substrate 10a at the tips of the projections 22 and supports the first substrate 10a.

The piezoresistive elements 40 are located on the first substrate 10a in the vicinity of the projections 22, i.e. the connection parts, of the second substrate 20.

Thus, in this embodiment, the second substrate 20 has non-connection parts, so that the first substrate 10a connects to the second substrate 20 only at the projections 22. This allows more stress to concentrate in the regions of the first substrate 10a in the vicinity of the projections 22. Accordingly, when the first substrate 10a deforms, the piezoresistive elements 40 located in the vicinity of the projections 22 change more greatly in resistance. The sensor element 2 according to this embodiment thus has further improved detection accuracy for the substance to be detected.

Third Embodiment

Figure 4:
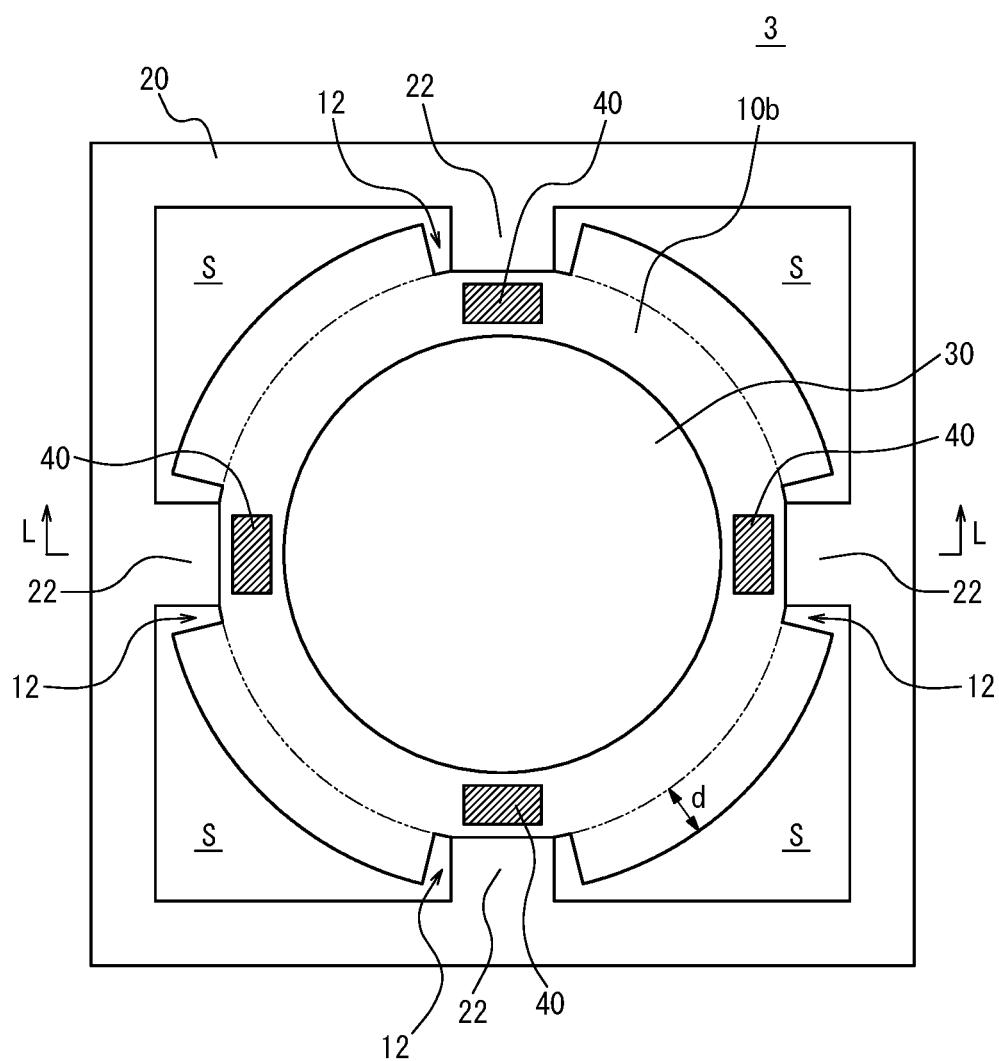
FIG. 4 is a top view illustrating a schematic structure of a sensor element according to a third embodiment of the present disclosure.

FIG. 4 is a top view illustrating a schematic structure of a sensor element 3 according to a third embodiment of the present disclosure. A sectional view along line L-L of the sensor element 3 illustrated in FIG. 4 is the same as the sectional view along line L-L of the sensor element 1 according to the first embodiment in FIG. 2, and therefore its illustration is omitted. Components in FIG. 4 that are the same as those in FIG. 1 are given the same reference signs, and their description is omitted.

A first substrate 10b differs from the first substrate 10 in the first embodiment in that it is perforated by notches S. Hence, the first substrate 10b connects to the second substrate 20 only at the projections 22. In other words, the second substrate 20 has connection parts which are connected to the first substrate 10b and non-connection parts which are not connected to the first substrate 10b. The connection parts herein are the tips of the projections 22 that project toward the first substrate 10b.

The first substrate 10b differs from the first substrate 10a in the second embodiment in that it is shaped so that its side surface projects toward the second substrate 20 except in the vicinity of the parts connected to the second substrate 20. In other words, the first substrate 10b has recesses 12 in part of its side surface, and connects to the projections 22 of the second substrate 20 at the bottoms of the recesses 12, as illustrated in FIG. 4. There is a gap between the side surface of each recess 12 and the side surface of the corresponding projection 22, as illustrated in FIG. 4.

The second substrate 20 surrounds the first substrate 10b, and connects to the bottoms of the recesses 12 of the first substrate 10b at the tips of the projections 22 and supports the first substrate 10b.

The piezoresistive elements 40 are located on the first substrate 10b in the vicinity of the projections 22, i.e. the connection parts, of the second substrate 20.

Thus, in this embodiment, the first substrate 10b is shaped so that its side surface projects toward the second substrate 20 except in the vicinity of the parts connected to the second substrate 20. That is, the first substrate 10b has the recesses 12, and connects to the projections 22 of the second substrate 20 at the bottoms of the recesses 12. This allows more stress to concentrate in the regions of the first substrate 10b in the vicinity of the projections 22. Accordingly, when the first substrate 10b deforms, the piezoresistive elements 40 located in the vicinity of the projections 22 change more greatly in resistance. The sensor element 3 according to this embodiment thus has further improved detection accuracy for the substance to be detected.

Figure 5:
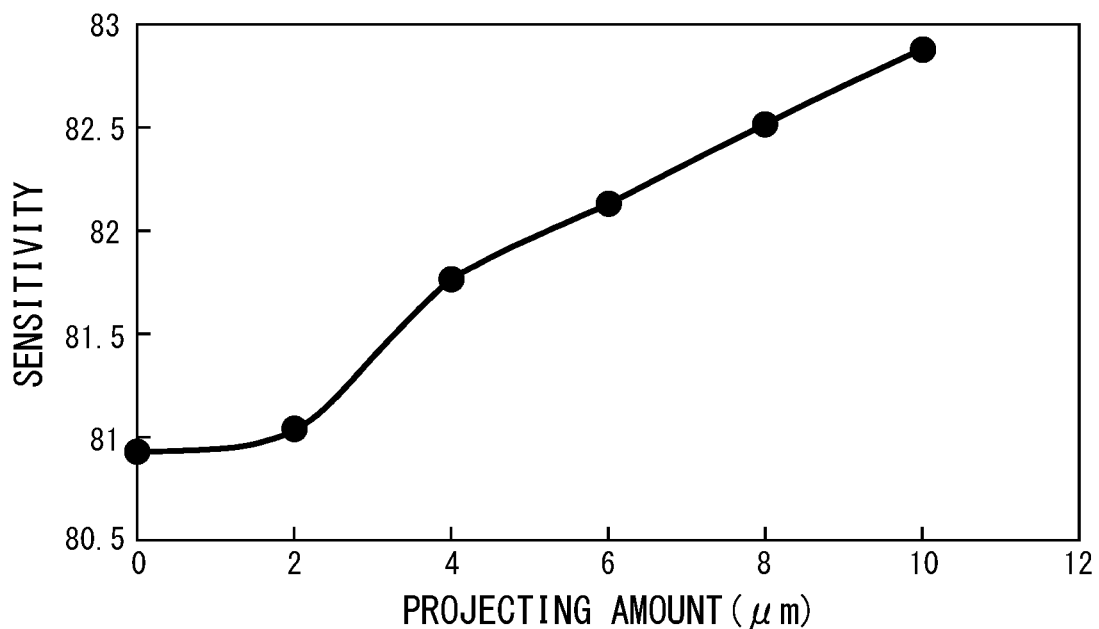
FIG. 5 is a diagram illustrating the relationship between the projecting amount and the sensitivity of the sensor element according to the third embodiment of the present disclosure.

FIG. 5 illustrates simulation results, with the horizontal axis representing the projecting amount d of the first substrate 10b (i.e. the depth of the recesses 12) in FIG. 4 and the vertical axis representing the sensitivity of the sensor element 3. Here, the sensitivity of the sensor element 3 is indicated as a relative change in resistance of the piezoresistive elements 40 when the substance to be detected is adsorbed by the sensitive membrane 30.

The simulation results illustrated in FIG. 5 indicate that the sensitivity of the sensor element 3 is greater as the projecting amount d of the first substrate 10b increases.

The thickness of the projecting parts of the first substrate 10b may be equal to the thickness of the non-projecting part of the first substrate 10b, or greater than the thickness of the non-projecting part.

Production Process for Sensor Element According to First Embodiment

Figure 6:
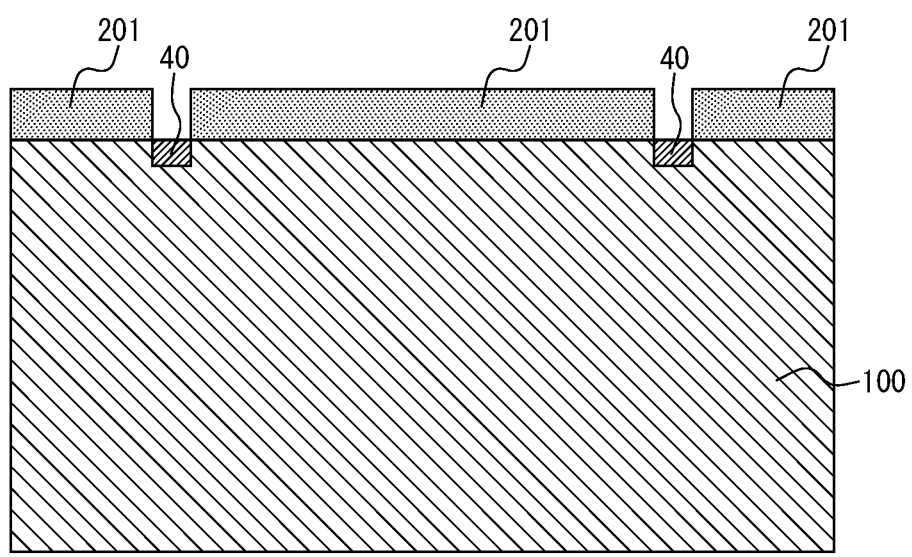
FIG. 6 is a sectional view for explaining a production process for the sensor element according to the first embodiment of the present disclosure.
Figure 7:
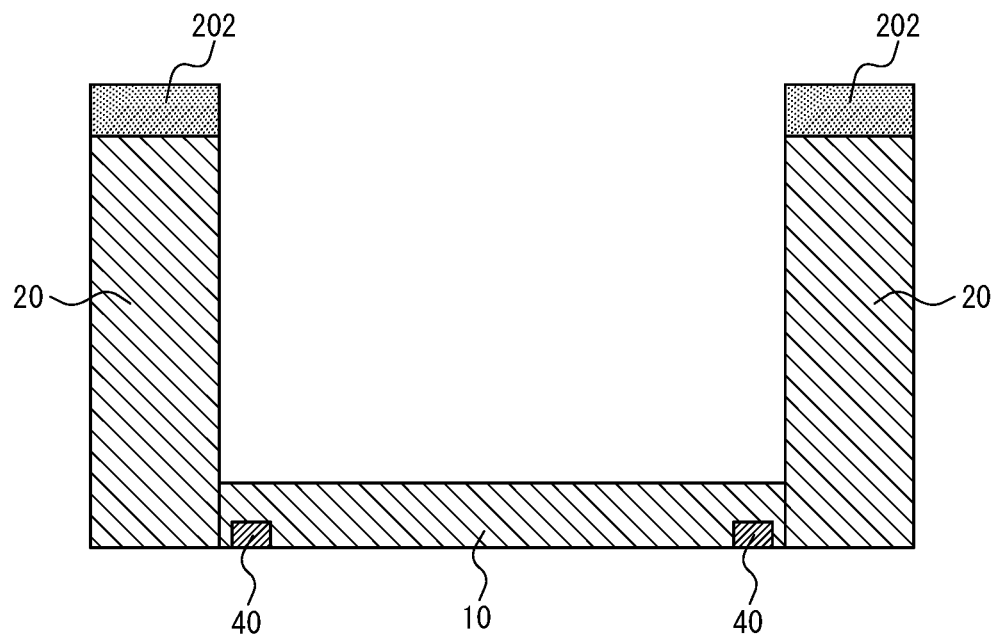
FIG. 7 is a sectional view for explaining the production process for the sensor element according to the first embodiment of the present disclosure.
Figure 8:
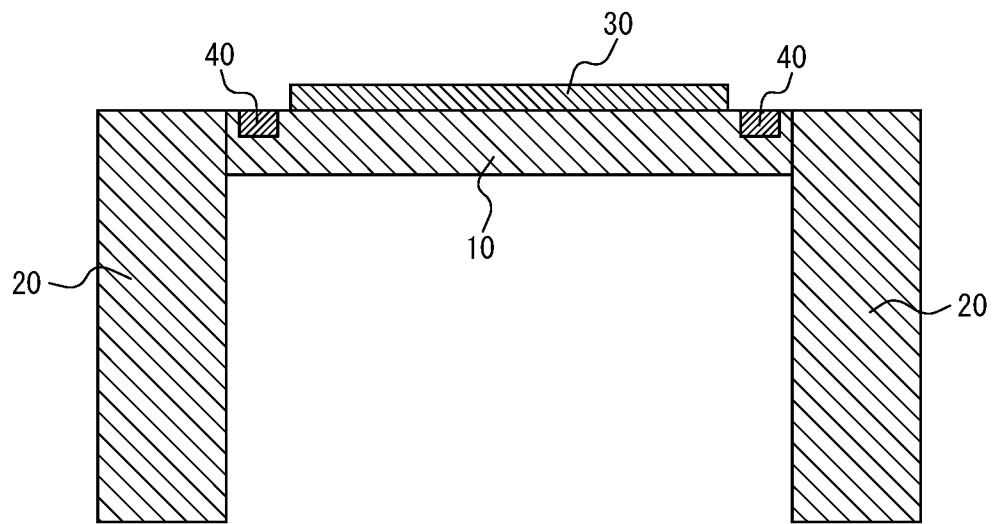
FIG. 8 is a sectional view for explaining the production process for the sensor element according to the first embodiment of the present disclosure.

An example of a production process for the sensor element 1 according to the first embodiment of the present disclosure will be described below, with reference to FIGS. 6 to 8. The sectional views in FIGS. 6 to 8 correspond to the section along line L-L in FIG. 1.

(1) Formation of Piezoresistive Elements

First, a Si substrate 100 is prepared. It is assumed herein that the Si substrate 100 is an n-type Si substrate. As illustrated in FIG. 6, a mask pattern 201 is formed on the Si substrate 100, and then a low concentration of boron (B) is injected into the openings of the mask pattern 201 by an ion implantation method, to form the piezoresistive elements 40. After the formation of the piezoresistive elements 40, the mask pattern 201 is removed.

(2) Formation of First Substrate and Second Substrate

Following this, the Si substrate 100 is turned upside down, and the first substrate 10 and the second substrate 20 are formed. As illustrated in FIG. 7, a mask pattern 202 is formed on the Si substrate 100, and then the opening of the mask pattern 202 is subjected to dry etching. Here, the mask pattern 202 has its opening in the part corresponding to the first substrate 10 in FIG. 1, in a top view. The part of the Si substrate 100 reduced in thickness by dry etching forms the first substrate 10. The part of the Si substrate 100 protected by the mask pattern 202 and not subjected to the dry etching forms the second substrate 20. After the formation of the first substrate 10 and the second substrate 20, the mask pattern 202 is removed.

(3) Formation of Sensitive Membrane

Following this, the Si substrate 100 is turned upside down again, and the sensitive membrane 30 is formed. As illustrated in FIG. 8, a sensitive membrane material is applied onto the first substrate 10 and then dried to form the sensitive membrane 30.

Production Process for Sensor Element According to Second Embodiment

An example of a production process for the sensor element 2 according to the second embodiment of the present disclosure will be described below. The production process for the sensor element 2 according to the second embodiment differs from the production process for the sensor element 1 according to the first embodiment in a process prior to the process illustrated in FIG. 7. In the production process for the sensor element 2 according to the second embodiment, before the process illustrated in FIG. 7, a mask pattern having openings in the parts corresponding to the notches S in FIG. 3 is used to perforate the Si substrate 100 in the notches S by dry etching.

Production Process for Sensor Element According to Third Embodiment

An example of a production process for the sensor element 3 according to the third embodiment of the present disclosure will be described below. The production process for the sensor element 3 according to the third embodiment differs from the production process for the sensor element 1 according to the first embodiment in a process prior to the process illustrated in FIG. 7. In the production process for the sensor element 3 according to the third embodiment, before the process illustrated in FIG. 7, a mask pattern having openings in the parts corresponding to the notches S in FIG. 4 is used to perforate the Si substrate 100 in the notches S by dry etching.

While some embodiments of the present disclosure have been described above by way of drawings and examples, various changes and modifications may be easily made by those of ordinary skill in the art based on the present disclosure. Such various changes and modifications are therefore included in the scope of the present disclosure. For example, the functions included in the functional units, means, etc. may be rearranged without logical inconsistency, and a plurality of functional units, etc. may be combined into one functional unit, etc. and a functional unit, etc. may be divided into a plurality of functional units, etc. Moreover, each of the disclosed embodiments is not limited to the strict implementation of the embodiment, and features may be combined or partially omitted as appropriate.

For example, although the first to third embodiments respectively describe the sensor elements 1 to 3 that each include four piezoresistive elements 40, the number of piezoresistive elements 40 included in each of the sensor elements 1 to 3 is not limited to four. Each of the sensor elements 1 to 3 may include any number of piezoresistive elements 40 that can detect the substance to be detected.

As the detectors for detecting the stress applied to the first substrate 10, 10a, or 10b, any other detection elements may be used instead of the piezoresistive elements 40.

Although the sensitive membrane 30 is disposed on the upper surface of the first substrate 10, 10a, or 10b in each of the first to third embodiments, the sensitive membrane 30 may be disposed on the lower surface of the first substrate 10, 10a, or 10b, or disposed on both the upper surface and the lower surface of the first substrate 10, 10a, or 10b.

REFERENCE SIGNS LIST 1, 2, 3 sensor element
10, 10a, 10b first substrate
12 recess
20 second substrate
22 projection
30 sensitive membrane
40 piezoresistive element (detector)
100 Si substrate
201, 202 mask pattern
S notch

The invention claimed is:
1. A sensor element comprising:
a first substrate;
a detector disposed on the first substrate; and
a second substrate surrounding the first substrate and supporting the first substrate,
wherein the second substrate is thicker than the first substrate, a plurality of notches are provided between the first and second substrates, the second substrate has a connection part which is connected to the first substrate and a non-connection part which is not connected to the first substrate, the detector is located in a vicinity of the connection part, and the connection part of the second substrate is a projection that is thicker than the first substrate and projects toward the first substrate.

2. The sensor element according to claim 1, wherein the first substrate has a recess in a part of a side surface thereof, and the projection of the second substrate is located in the recess of the first substrate.

3. The sensor element according to claim 2, wherein a gap is provided between a side surface of the recess and a side surface of the projection, in a top view.

4. A sensor element comprising:

a first substrate;

a sensitive membrane provided on the first substrate;

a detector disposed on the first substrate; and a second substrate surrounding the first substrate and supporting the first substrate, wherein the second substrate is thicker than the first substrate, the second substrate has a projection that is thicker than the first substrate and projects toward the first substrate, and the detector is located on the first substrate between the sensitive membrane and the projection without contacting the projection.

5. The sensor element according to claim 4, wherein the first substrate has a recess in a part of a side surface thereof, and the projection of the second substrate is located in the recess of the first substrate.

6. The sensor element according to claim 5, wherein a gap is provided between a side surface of the recess and a side surface of the projection, in a top view.

7. The sensor element according to claim 4, wherein a plurality of notches are provided between the first substrate and second substrate.

8. The sensor element according to claim 4, wherein the sensor element comprises a plurality of detectors;

the second substrate has a plurality of projections that are thicker than the first substrate and project toward the first substrate; and the plurality of detectors are located on the first substrate between the sensitive membrane and the projections without contacting the projections, respectively.

9. The sensor element according to claim 8, wherein a plurality of notches are provided between the first substrate and second substrate.

10. A sensor element comprising:

a first substrate;

a detector disposed on the first substrate; and a second substrate surrounding the first substrate and supporting the first substrate, wherein the second substrate is thicker than the first substrate, the second substrate has a connection part which is connected to the first substrate and a non-connection part which is not connected to the first substrate, the detector is located in a vicinity of the connection part, the connection part of the second substrate is a projection that projects toward the first substrate, the first substrate has a recess in a part of a side surface thereof, and the projection of the second substrate is located in the recess of the first substrate.

11. The sensor element according to claim 10, wherein a gap is provided between a side surface of the recess and a side surface of the projection, in a top view.

* * * * *